United States Patent Office 3,466,339
Patented Sept. 9, 1969

3,466,339
**CONVERSION OF ACROLEIN AND METH-
ACROLEIN INTO THE CORRESPONDING
UNSATURATED ALCOHOLS**
Coenraad J. Duyverman, Sittard, Netherlands, assignor to
Stamicarbon N.V., Heerlen, Netherlands
No Drawing. Filed Aug. 13, 1965, Ser. No. 479,610
Claims priority, application Netherlands, Aug. 18, 1964,
6409479
Int. Cl. C07c 29/14
U.S. Cl. 260—638
2 Claims

ABSTRACT OF THE DISCLOSURE

A process for the reduction of acrolein or methacrolein to the corresponding unsaturated alcohols is described wherein the reduction takes place in the liquid phase using a copper of cadmium soap as the catalyst.

---

The invention relates to a process for the conversion of acrolein and methacrolein into the corresponding unsaturated alcohols.

It is known that unsaturated carbonyl compounds can be reduced, either in the gas phase or in the liquid phase, to the corresponding unsaturated hydroxyl compounds with the aid of hydrogen and a solid catalyst containing copper and cadmium.

A drawback attached to reducing in the gas phase are the fairly large losses of starting material caused by polymerization.

Operating in the liquid phase with a solid catalyst has the drawback that vigorous stirring is required to keep the solid catalyst particles homogeneously suspended, while, if a bed of solid catalyst particles is employed, much energy is needed for recycling the liquid reaction mixture.

It is an object of the present invention to prepare unsaturated alcohols by conversion of acrolein or methacrolein by a novel and improved process. It has now been found that unsaturated alcohols are obtained by reducing the corresponding unsaturated carbonyl compounds of the group of acrolein and methacrolein at elevated pressure and in the liquid phase with hydrogen, if a mixture of copper soap and cadmium soap homogeneously dissolved in said liquid phase is used as catalyst.

The use of the catalyst system according to the invention, i.e. Cu and Cd soaps, which dissolve homogeneously in the liquid phase, obviates the above mentioned drawbacks attached to the prior art.

It should be pointed out here that the use of a mixture of Cu and Cd soaps as homogeneously dissolved catalyst in the reaction medium has already been proposed for the reduction of unsaturated fatty acids to the corresponding unsaturated fatty alcohols.

It was not to be expected that such a catalyst system could be advantageously applied in the reduction of acrolein and methacrolein, in which the aldehyde group to be reduced is located immediately beside the double bond in the chain.

In the process according to the invention it is preferred to use a mixture of copper soap and cadmium soap with a molar ratio equal to 1:1. This ratio may be varied, however, between 3:1 and 1:10. At a molar Cu/Cd ratio exceeding 3:1, the selectivity of the reduction strongly decreases and predominantly the carbon-carbon unsaturated bond is attacked, with formation of propionaldehyde or isobutyraldehyde instead of the unsaturated alcohols, allylalcohol or methallylalcohol, respectively. At a molar Cu/Cd ratio below 1:10, the catalyst becomes instable, precipitates from the solution and thus becomes inactive.

It has appeared that the selectivity with respect to the formation of unsaturated alcohols is highly dependent on the temperature. The reduction starts at appr. 125° C., but at temperatures between 125 and 200° C. especially the carbon-carbon double bond is hydrogenated, whereas above 200° C. predominantly the carbonyl group is reduced. A suited temperature range for the formation of the unsaturated alcohols is between 200 and 300° C. To achieve a sufficiently fast reaction rate, the reduction of unsaturated aldehyde to unsaturated alcohol has to be effected under pressure. No influence of the pressure on the selectivity was noted. An increase of the hydrogen pressure causes acceleration of the reaction. Preferably a pressure of 30–200 at. is used, but higher pressures may also be employed, although this does not offer any special advantages.

If the reaction is carried out in the liquid phase, the unsaturated aldehyde is dissolved in a suitable solvent. With regard to the reaction conditions, the starting material and the compounds formed in the reaction, said solvent must behave as an inert substance. The solvent must moreover have an adequate dissolving power with respect to hydrogen and, preferably, a relatively low vapour pressure.

These conditions are satisfied by saturated aliphatic and aromatic hydrocarbons with 10–15 C atoms, such as undecane, decahydronaphthalene or high-boiling paraffin oils.

The concentration of the catalyst in the reaction mixture has an effect on the reaction rate. The reaction rate decreases with this concentration. Good results can be obtained with mixtures with a total content of Cu and Cd soap between 0.4 and 10 mol percent calculated to the amount of unsaturated aldehyde to be converted.

EXAMPLE

For hydrogenating acrolein to allylalcohol, a reaction mixture consisting of:

| | |
|---|---:|
| Decahydronaphthalene _____ ml__ | 500 |
| Acrolein (=0.225 mol) _____ ml__ | 15 |
| Cuprioleate (=0.00225 mol) _____ g__ | 1.43 |
| Cadmiumoleate (=0.00225 mol) _____ g__ | 1.52 | was subjected to a pressure of 55 at. by admission of hydrogen and heated at a temperature of 225° C. During the reaction samples were taken and analyzed. It appeared that acrolein was being converted into allylalcohol, with formation of the saturated alcohol (propanol) and propionaldehyde as byproducts. The table gives the results of the analyses, the degree of acrolein conversion and the selectivity of the hydrogenation. By degree of conversion is understood here the mol percentage of the acrolein that has been converted, the term selectivity denoting the mol percentage of allylalcohol with regard to the percentage of converted acrolein.

| Sample | Reaction time, h. | Composition of sample, mol percent | | | | Degree of conversion, percent | Selectivity, percent |
|---|---|---|---|---|---|---|---|
| | | Acrolein | Allyl-alcohol | Propanol | Propion-aldehyde | | |
| 1 | ½ | 59.4 | 28.4 | 2.9 | 9.3 | 40.6 | 75 |
| 2 | 2¾ | 27.0 | 54.1 | 7.6 | 11.3 | 73.0 | 74 |
| 3 | 4 | 24.2 | 54.8 | 8.0 | 13.0 | 75.8 | 72.0 |

What is claimed is:

1. A process according to claim 2 wherein 0.4–10 moles of catalyst soap are employed per 100 moles of acrolein or methacrolein.

2. A process for the reduction of an $\alpha,\beta$-unsaturated aldehyde selected from the class consisting of acrolein and methacrolein into the corresponding unsaturated alcohol comprising maintaining said $\alpha,\beta$ unsaturated aldehyde in the liquid state in an inert solvent selected from the group consisting of saturated aliphatic and aromatic hydrocarbons with 10 to 15 carbon atoms, at an elevated temperature between about 200 and 300° C., under a hydrogen pressure between about 30 and 200 atmospheres, and in the presence of a catalyst consisting essentially of a mixture of a copper soap and a cadmium soap wherein the molar ratio of copper to cadmium is between about 3:1 and 1:10.

References Cited

UNITED STATES PATENTS

| 2,009,948 | 7/1935 | Schmidt et al. |
| 2,023,383 | 12/1935 | Schrauth et al. |
| 2,340,687 | 2/1944 | Richardson et al. |
| 2,763,696 | 9/1956 | Finch et al. |

FOREIGN PATENTS

| 858,247 | 12/1952 | Germany. |
| 22,735 | 2/1962 | Germany. |

LEON ZITVER, Primary Examiner

J. E. EVANS, Assistant Examiner

U.S. Cl. X.R.

252—431